US008572675B2

(12) United States Patent
Chazin (10) Patent No.: US 8,572,675 B2
(45) Date of Patent: Oct. 29, 2013

(54) SYSTEM AND METHOD FOR FACILITATING THE PROVISION OF WEB SERVICES ACROSS DIFFERENT INTERNET SECURITY DOMAINS

(75) Inventor: David Chazin, Denver, CO (US)

(73) Assignee: The Boeing Company, Chicago, IL (US)

( * ) Notice: Subject to any disclaimer, the term of this patent is extended or adjusted under 35 U.S.C. 154(b) by 428 days.

(21) Appl. No.: 12/418,402

(22) Filed: Apr. 3, 2009

(65) Prior Publication Data

US 2010/0257587 A1 Oct. 7, 2010

(51) Int. Cl.
*H04L 29/06* (2006.01)
*G06F 21/20* (2006.01)

(52) U.S. Cl.
USPC .................................. 726/1; 726/13

(58) Field of Classification Search
CPC .................. H04L 63/0227; H04L 63/0245
USPC ................................ 726/3, 5, 1, 13
See application file for complete search history.

(56) References Cited

U.S. PATENT DOCUMENTS

| 7,689,699 | B2 * | 3/2010 | Chazin .......................... 709/229 |
| 2004/0025016 | A1 * | 2/2004 | Focke et al. ..................... 713/164 |
| 2005/0165656 | A1 * | 7/2005 | Frederick et al. ................. 705/26 |
| 2005/0259655 | A1 * | 11/2005 | Cuervo et al. ................... 370/392 |
| 2006/0265720 | A1 * | 11/2006 | Cai et al. ........................ 719/330 |
| 2007/0204145 | A1 * | 8/2007 | Bunn et al. ..................... 713/152 |
| 2007/0204337 | A1 * | 8/2007 | Schnackenberg et al. ...... 726/11 |
| 2008/0072290 | A1 * | 3/2008 | Metzer et al. ..................... 726/3 |
| 2008/0307101 | A1 | 12/2008 | Chazin .......................... 709/229 |

OTHER PUBLICATIONS

Pasley, James—How BPEL and SOA are changing Web services development. Internet Computing, IEEE May-Jun. 2005 vol. 9 Issue 3 p. 60-67.*

Limam et al.—OSDA: Open service discovery architecture for efficient cross-domain service provisioning. Computer Communications. vol. 30, Issue 3. Feb. 2, 2007, pp. 646-563. http://www.sciencedirect.com/science/article/pii/S0140366405004603.*

* cited by examiner

*Primary Examiner* — Jung Kim
*Assistant Examiner* — Ngoc D Nguyen
(74) *Attorney, Agent, or Firm* — Woodcock Washburn LLP (57) ABSTRACT

A method and apparatus for cross-domain Web-service publishing of information regarding a Web service provider in a first domain having a first security clearance access level into a second domain having a second security clearance access level across a cross-domain security system may comprise a cross-domain publishing service within the second domain receiving through the security system a request to publish information regarding the Web service provider located in the first domain; and may comprise the cross-domain publishing service establishing a surrogate end point within the second domain corresponding to the Web service provider and making available at the surrogate end point Web service information regarding the provision of a Web service by the Web service provider. The second domain cross-domain publishing service may register the Web service provider within the second domain and may also provide a link to the surrogate endpoint.

8 Claims, 5 Drawing Sheets

SYSTEM AND METHOD FOR FACILITATING THE PROVISION OF WEB SERVICES ACROSS DIFFERENT INTERNET SECURITY DOMAINS

FIELD

The present disclosure relates to a system and method for facilitating cross-domain publishing and discovery of Web services between domains of differing access permission (security clearance) levels through a cross-domain security system, such as a trusted guard, such as a high assurance guard ("HAG").

BACKGROUND

Web services may be employed using a service oriented architecture ("SOA") based system having Web services components (e.g., a Web service requester/user and a Web service provider) respectively operating at end points in different domains at different access permission levels, typically in different security classification access permission level domains. Such a multiple level security ("MLS") or multiple independent level of security ("MILS") environment, requires executing service calls and passing information through secure channels. Such a secure channel may be a part of a cross-domain security ("CDS") system. The CDS system may comprise a trusted guard, such as a high assurance guard ("HAG") in order to maintain information access integrity (security). High assurance guards typically are built to permit one way communication channels only, in order to prevent such security lapses as leakage, probing, and inadvertent passing of classified information into a domain of lower classification clearance level. The HAG in allowing for only one way communication from the lower access permission level to the higher access permission level, may to prevent such things as browsing through the higher access permission level domain from lower access permission level domain, or even vice-versa. This one way communication may, therefore, be in either direction across the domain boundary through the HAG.

HAGs may also unwrap messages and review content, e.g., by applying key word tests or other rules or logic, well known in the art, to automatically, or with human intervention, block the passage of a message from a higher access permission level domain (e.g., a higher security classification access permission level) to the lower access permission level domain (e.g., a lower security classification access permission level). Content may also be evaluated in messages from the lower level domain to the higher level domain, e.g., to keep out viruses, spyware and the like.

The HAG may make determinations, such as through examining the content of a bypass object, to evaluate whether the information being transferred is of appropriate classification to leave the higher classified domain and enter the lower classified domain. Security guard algorithms may rely on such information as indicated by such as the bypass object, such as the format of the data, and, e.g., verify that specified fields contain specific values before allowing transfer. Other rules, criteria, algorithms and the like may be used as filters/screens.

A multilevel security computer system such as a HAG may thus be used to communicate between different security domains, such as from the NIPRNet to the SIPRNet, utilizing, e.g., a Controlled Interface ("CI") between security levels. A controlled interface may function as a multilevel security system used to transfer low-classification data between security domains. Multilevel security may function to apply computer processing of information with different sensitivities (i.e., at different security levels), and as noted above, permit access by users with different security clearances and needs-to-know, and prevent users from obtaining access to information for which they lack authorization.

The data to be transferred between different security level domains may theoretically move in either direction, however in most HAGs the communication protocols are most often modified, such as to only allow one way transfers of messages/data in transferring the information. This facilitates the HAG being able to control the establishment of and to monitor the substance of communication between a requester of information and a provider of information across the domain boundary. The controlled interface ensures the HAGs ability to perform its screening role, and also prevent such security leaks as unauthorized browsing, and the like.

A normal protocol over a networked communication system such as the Internet comprises the transfer of a request for information along with a return address for the information to be returned to the requester by the provider. As such, it will not pass through a HAG. Among other ways to block two way communication through the cross-domain security system such as a HAG, the return address will be stripped. This constraint is thus incompatible with common networking protocols (such as transfer control protocol/internet protocol or TCP/IP) and higher level constructs built on this construct (including many used for publishing, discovery, initiating and performing Web services). Among other things the protocols depending on two-way message communication to, among other things, verify message receipt and identify response destination are stymied.

Security clearance, such as governmental/military classifications like "CLASSIFIED", "SECRET" AND "TOP SECRET", etc. are not the only access permission criteria that may be enforced with a cross-domain security system such as a trusted guard, e.g., a HAG. There may also be other reasons within or between local area networks ("LANs") and wide area networks ("WANs"), including the Internet, and also including intranet domains, and sub-domains of any of these, for differing levels of access permission. For example, within a company, personnel records may be classified with restricted access, but various parts of the company may need to be provided with limited access to such files and the information contained in them.

In order to build and implement Web services architectures, such as can implement a SOA, and pass such information as needed for the Web service user and Web service provider to interact remotely over some network, Web service providers located at endpoints in one access permission level domain, which are permitted to accept requests from a Web service user/requester located in another access permission level domain, need to be able to expose (i.e., advertise) their availability and capability(ies) and performance characteristics and the like in the other access permission level domain (referred to in the present application as "publishing"). As noted, typically, but not always, the other access permission level domain will have lower level of access permission (less stringent criteria for access), e.g., for governmental/military security classification clearance, a lower level of security clearance and thus access permission.

In addition to publishing their availability, as part of publishing their capabilities and performance characteristics, they also need, at a minimum, to expose their service contracts in a fashion that is usable, e.g., by automated software tooling to generate client side bindings and permit service orchestration in an appropriate manner. There is a need to allow sharing of information that should be unclassified between a classified security domain and a security domain of lower classification. Such sharing may be, by way of example, information in and of itself that would not be classified if it were not within a file/folder in, e.g., a domain served by a more highly classified, such as "SECRET," system high machine. There is a need to allow cross-domain sharing of Web services information, including such publishing, between domains of differing classification.

Thus, by way of example, in the field of law enforcement, information about an individual being investigated may itself not be classified, but the source of the information may be, so that access to documents revealing both the information and the source is limited by the security classification. As another example in the field of supply management, the fact that supplier X can deliver a certain component with certain price, delivery schedule, etc. may not in and of itself be classified, but the fact this information comes from a document that indicates the part is currently being used/tested in a classified weapons system project under development may be. The fact that a certain system is under development or in existence may also in and of itself be classified, so that documents mentioning such system, even containing other unclassified information may be classified. As mentioned, communication from a lower classification domain may be desirably limited as well, such as to block the transmission of viruses and the like into the higher classification domain from the lower classification domain.

Discovery is the act of locating a machine-processable description of a Web service-related resource (Web service provider) that may have been previously unknown and that meets certain functional criteria. Discovery may be utilized to match a set of functional and other criteria with a set of resource descriptions. The goal is to find an appropriate Web service and a Web service provider. Discovery, the analog to publishing, like searching with a search engine, whether solely through an automated Internet tool or involving human interaction, also cannot occur across a cross-domain security system. Utilization of a discovery service, which may utilize agents, automated or human or partly both, to retrieve Web service information such as a Web service-related resource description, is blocked across the domain boundary.

Such publishing and discovery of a particular Web service end point from a collection of possible Web service provider end points is thus currently not possible through a cross-domain security system, such as a trusted guard, such as a HAG.

There is, therefore, a need for a system and method allowing for Web service publishing and/or discovery that operates across domains with a trusted guard interface such as a one way controlled interface, such as a HAG.

Once the Web service requester and provider are linked, a system such as disclosed in co-pending U.S. Published Patent Application No. 20080307101, published on Dec. 11, 2008, entitled METHOD AND APPARATUS FOR EXECUTING WEB SERVICES THROUGH A HIGH ASSURANCE GUARD can enable the provision and utilization of the service over the communication medium, such as the Internet even through a cross-domain security system, such as a HAG.

SUMMARY

The present disclosure allows Web Services to be published and subscribed to across network domains at different security-level classifications according to the rules enforced by high assurance guards (cross-domain guards) and in a manner that allows existing software tooling to operate on these interfaces without any changes. This allows Service Oriented Architectures to be implemented in a standard manner across Multi-Level Security (MLS) and Multiple Independent Levels of Security (MILS) environments.

More particularly, the present disclosure provides a method and apparatus for cross-domain web-service publishing of web service information regarding a Web service provider in a first domain having a first security clearance access level into a second domain having a second security clearance access level across a cross-domain security guard which may comprise a second domain cross-domain publishing service within the second domain receiving through a high assurance guard a request to publish Web service information regarding the Web service provider located in the first domain. The disclosure also may comprise a second domain cross-domain publishing service, in response to the receipt of the request to publish, establishing a surrogate end point within the second domain corresponding to the Web service provider and making available at the surrogate end point Web service information regarding the provision of a Web service by the Web service provider. The second domain cross-domain publishing service may register the Web service provider within the second domain and may also provide a link to the surrogate endpoint. The surrogate endpoint upon receiving a request for Web services information from a requester within the second domain may return Web service information identifying the Web service provider located within the first domain. The Web service information made available at the surrogate end point may comprise a Web Services Description Language (WSDL) which identifies the location of the Web service provider within the first domain. The registration may comprise registration in a directory service or registry within the second domain. The system and method may comprise facilitating the provision of service oriented architectured Web services across a domain boundary between a first domain having a first security clearance access level and a second domain having a second security clearance access level which may comprise providing for automated publishing of a Web service provider in the first domain to a Web service requester in the second domain and for automated discovery by a Web service requester in the second domain of a Web service provider in the first domain. The system and method also may comprise facilitating the use of cross-domain workflows or Business Process Execution Language (BPEL) across a domain boundary between a first domain having a first security clearance access level and a second domain having a second security clearance access level which may comprise providing for automated publishing of a Web service provider in the first domain to a Web service requester in the second domain and for automated discovery by a Web service requester in the second domain of a Web service provider in the first domain. The system and method also may comprise facilitating the provision of service oriented architectured Web services across a domain boundary between a first domain having a first security clearance access level and a second domain having a second security clearance access level which may comprise providing within the second domain an endpoint for automated tooling, locally in the second domain, to operate on to discover and link to a Web service provider in the first domain. The automated tooling may return from the local endpoint in the second domain a WSDL identifying a Web service provider in the first domain.

BRIEF DESCRIPTION OF THE DRAWINGS

The features, functions, and advantages that have been discussed can be achieved independently in various embodiments of the present disclosure or may be combined in yet other embodiments further details of which can be seen with reference to the following description and drawings, wherein like numerals depict like parts, and wherein.

DETAILED DESCRIPTION

The present disclosure provides a system and method solving the above noted and other problems with existing systems and methods. The disclosed subject matter has potentially widespread use in the Armed Forces, Intelligence, Homeland Security, Law Enforcement, and other communities where there is a need to build integrated systems that require data sources from multiple security domains and disparate data processing systems. The disclosed subject matter facilitates building next generation information fusion and sharing environments for Armed Forces, Intelligence, Homeland Security, Law Enforcement and like users.

Figure 1:
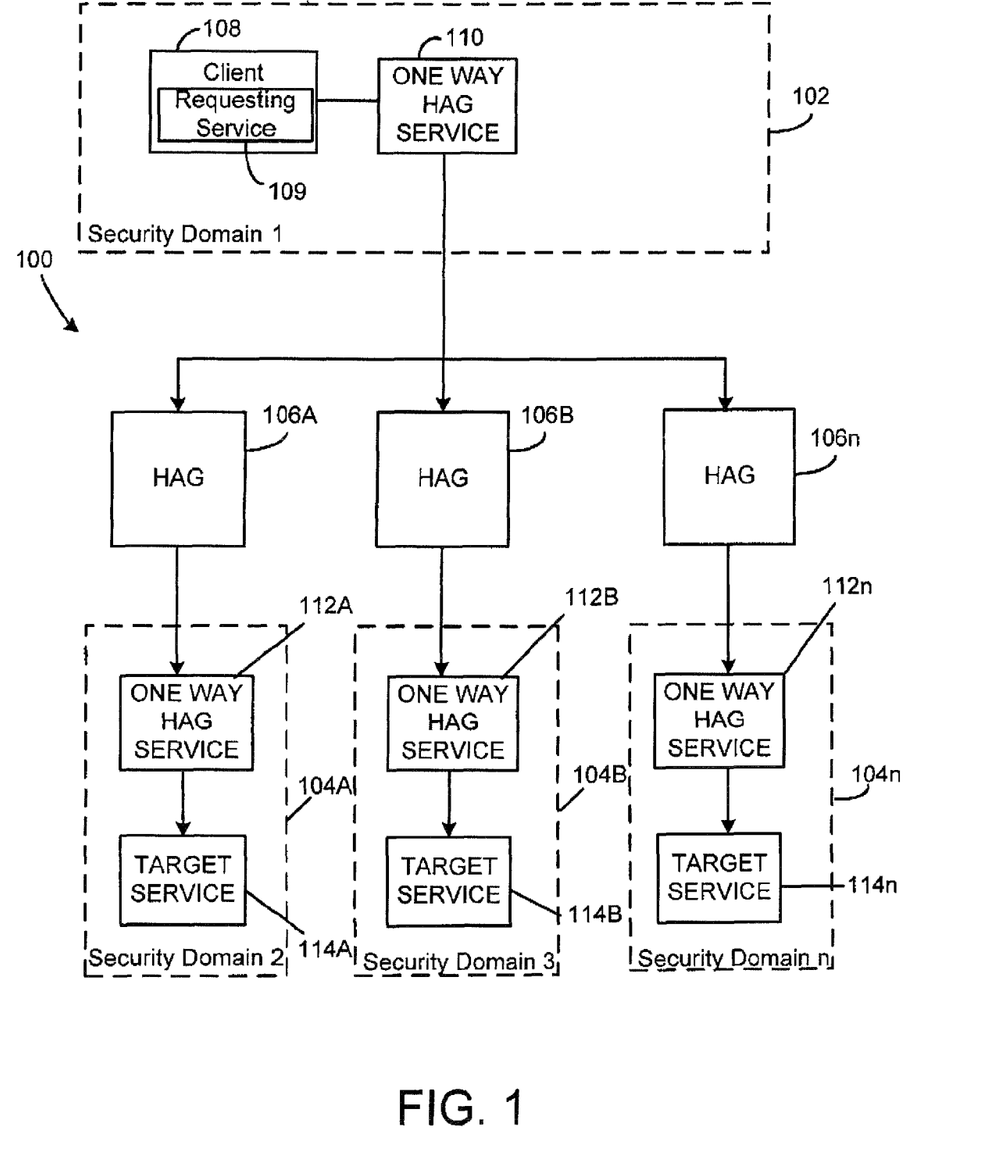
FIG. 1 shows schematically and in block diagram form, a cross-domain security system which may utilize a possible embodiment of the disclosed subject matter.

Turning now to FIG. 1 there is shown schematically and in block diagram form a cross-domain security system 100 which may comprise a source security domain 102 communicatively coupled with one or more destination security domains 104A-104n via associated HAGs 106A-106n. The source security domain 102 may include a client 108 requester of Web services through a Web service request 109. The system 100 may communicate with one or more of a plurality of Web service providers 114A-n in a respective one of the domains 104A-n through a source one-way HAG service 110 in the security domain 1 and a respective HAG 106A-n and a one way service provider HAG service 112A-n in the respective domain 104A-n. The destination security domains 104A-n may be, but are not necessarily, of a higher security clearance classification than the domain 102, and one or more of the domains 104A-n may be of the same or lower security classification.

Each destination security domain 104A-n may include a respective destination one-way HAG service 112A-n and the target service provider 114A-n. It will be understood that source and destination are used in this context to indicate the source of a message, in the illustrated case from the client 108 requester of a Web service to one of the target service providers 114A-n as the destination of the message. For messages traveling the other way, the respective target service provider 114A-n would be the "source" system and the Web service requester 108 would be the "destination" system.

The source one-way HAG service 110 accepts the target service request, inspects the target service request to determine if the target service request violates any rule, criteria or the like being implemented for cross-domain security, and, if not, transmits the target service request to the appropriate destination one-way HAG service 112A-n via the respective one-way HAG 106a-n, or, if yes, discards the target service request.

The one-way HAG services 110, 112A-n may, e.g., make use of content based routing to intelligently route a message from the client system 108 through the high assurance guard service 110 on the originating side and to the proper high assurance guard service 112A-n on the delivery side through the respective HAG 106A-n, in order to pass the message to the respective desired target service 114A-n. Such content based routing may be provided by the infrastructure hosting the Web Service such as an Enterprise Service Bus ("ESB") (not shown) or by the respective Web service provider 114A-n itself.

As noted in the above referenced co-pending US Published Patent Application No. 20080307101, in some cases Web services may be implemented across such a cross-domain security system 100. However, in most cases this is not possible, and Published Application 20080307101 discloses a system to allow this to occur.

According to a possible embodiment of the subject disclosure, a system and method for facilitating the provision of Web Services across different security domains may be provided through, as an example, enabling the secure cross-domain publishing and discovery of such Web Services across boundaries of different domains with different access permission levels (security classifications), connected by cross-domain security features, such as, a HAG.

According to the W3C Web Services Architecture Working Group, Web services are defined as a software system designed to support interoperable machine-to-machine interaction over a network. This may include an interface described in a machine-processable format (specifically WSDL), allowing other systems to interact with the Web service in a manner prescribed by its description, e.g., using SOAP-messages, typically conveyed using hypertext transfer protocol ("HTTP") with an extensible markup language ("XML") serialization in conjunction with other Web-related standards. The Web service is an abstract resource that represents a capability of performing tasks forming a coherent functionality from the point of view of a provider entity and a requester entity. To be used, a Web service must be realized by a concrete provider agent. The information exchanged between a prospective/actual Web service user (Web service requester) in order to locate and link to the Web service provider, and to identify, initiate and execute the necessary technical, legal, communication channel connection, etc. requirements for the actual provision of the Web service to a remote user, in the present application, unless expressly indicated otherwise, are collectively referred to as "Web service information."

Such Web service information as used in this application and the accompanying claims, is intended to mean such location designators, e.g., URLs, documentation such as WSDLs, Web service profiles, and like documents, data and information as may be typically exchanged during the publishing, discovery, selection, linking and execution of Web services. Web service information shall include but not be limited to the necessary information to carry out any particular transaction involved with the various activities set out in a Web services Service Oriented Architecture, involving among other things cross-domain workflows, SOAP and other protocols, Business Process Execution Language and like languages, to publish, find and utilize Web services.

The scope and meaning of Web services information in the present application shall not be limited by the fact that currently a particular form of Web services information is not utilized in the transactions involved with either or both of publishing and discovery of Web services, and/or the linking of a Web service requester to a Web service provider, or the initiation of the provision of web services by a Web services provider for a Web services requester/user, intra-domain or cross-domain, but only is so created or adopted in the future. The scope and meaning of the disclosed and claimed subject matter, and particularly of "Web services," is, therefore, not to be limited to some fixed definition of features and aspects either set forth in the present disclosure or understood in the art at this time, but rather is to be interpreted in the context of the disclosed subject matter as a whole.

As a general model of a services oriented architecture ("SOA"), for the provision of Web services, services may be accessed by any computers communicating with each other over a network, such as the Internet or World Wide Web ("www"). A remote platform may be utilized as the service provider, or remotely stored software may be accessed and run, or remotely stored databases/knowledge bases may be accessed and utilized, or combinations of these may occur.

In one model, a service broker may receive a request for a given Web service from a client requester, and may search for a provider of the requested service, including searching in a repository (such as a UDDI) maintained by the service broker, or maintained by others, and, e.g., made generally available to users of the network. The repository may identify providers of Web services and may also contain information provided by the Web service provider about how to access and utilize the Web service, e.g., a description of the bindings, protocols, etc. to be used, such as in the form of a WSDL or including a WSDL. The broker can then identify the service provider to the client requester and provide the WSDL and the service provider and client requester can then communicate via, e.g., SOAP to interact in the form of the requester getting the service from the provider.

This is not the only model upon which this type of interaction can operate, which is also evolving over time. There may be, now or in the future, for example, no need for a broker. The requestor/user may access a repository, or many repositories, such as a universal discovery, description and integration ("UDDI"). An automated Internet tool may access the one or more repositories, and/or directly search Web service provider information such as on web-pages and the like of the Web service provider or others, e.g., with an appropriate search engine(s).

In addition to containing such as a link to the Web service provider, for the requester/user to employ to initiate contact with the Web service provider, the necessary web service information, or other pieces of it besides simply a link to the Web service provider may reside at the broker URL or within the registration repository, such as the UDDI.

Therefore, as used in the present disclosure an endpoint, and particularly a surrogate endpoint, is meant to include any location accessible over a network that contains some or all of the Web service information, necessary for publication, discovery, initiation and/or execution of Web services. This is without regard for where the web service information is located within its respective access permission level domain, including, by way of example, a separately established URL (unique surrogate endpoint), a URL within the repository site URL, or established by or controlled by the custodian of the repository, or likewise within the URL for a broker or established or controlled by the broker, etc. The surrogate endpoint is a mechanism for enabling the publication and discovery locally within a domain of remote Web service providers from outside of the domain, followed by the provision of Web services from outside of the domain to the requester within the local domain, according, e.g., to the system and method of co-pending US Published Patent Application 20080307101.

As noted above, in order for Web services to be effectively utilized, the provider(s) of a Web service also must be able to advertise to the potential requesters their availability and capability, so called "publishing." Publishing a Web service enables a Web service user (requester/consumer) to locate the web service description and instructions on how to interact with the Web service, such as using a subscribed publisher like DISCO or using a universal discovery, description and integration ("UDDI") repository or a like repository.

Subscribed repositories like DISCO may be used by requesters who, through DISCO, have been provided beforehand with the necessary information to access a Web service from a particular provider, and, as such, are less relevant to the disclosed subject matter. A UDDI can provide a directory of Web Services, enabling prospective Web service consumers to search for and locate Web services, if the consumer is not aware of the exact location of the service or the owner of the service, similarly to the searching done by Google or Yahoo for Web pages of a certain characteristic(s). A repository such as a UDDI enables finding a Web service provider through a centralized registry of businesses which may be accessible over the Internet, UDDI itself being accessible over the Internet.

A system and method according to a possible embodiment of the present disclosure may publish Web service description language ("WSDL") documents and set up a surrogate endpoint in a different security level domain through a security channel, such as a cross-domain trusted guard, such as a HAG. The system and method in one possible embodiment may facilitate the use of cross-domain workflows and business process execution language ("BPEL") by allowing the automated publishing and discovery of web services in different security level domain, as opposed to known systems and methods wherein WSDL must be manually transferred between security domains of different levels, registries have to be manually updated and surrogate endpoints have to be manually created.

The present disclosure allows Web services to be published and discovered across domains with different access permission levels despite the security restrictions, such as, rules enforced by secured guards/channels. Thus, according to one possible embodiment of the disclosure existing publishing/discovery software tooling may be enabled to operate through such a secured interface guard without any significant modifications or changes. This can, for example, allow service oriented architectures to be implemented in a standard manner across such as MLS and MILS environments.

Figure 2:
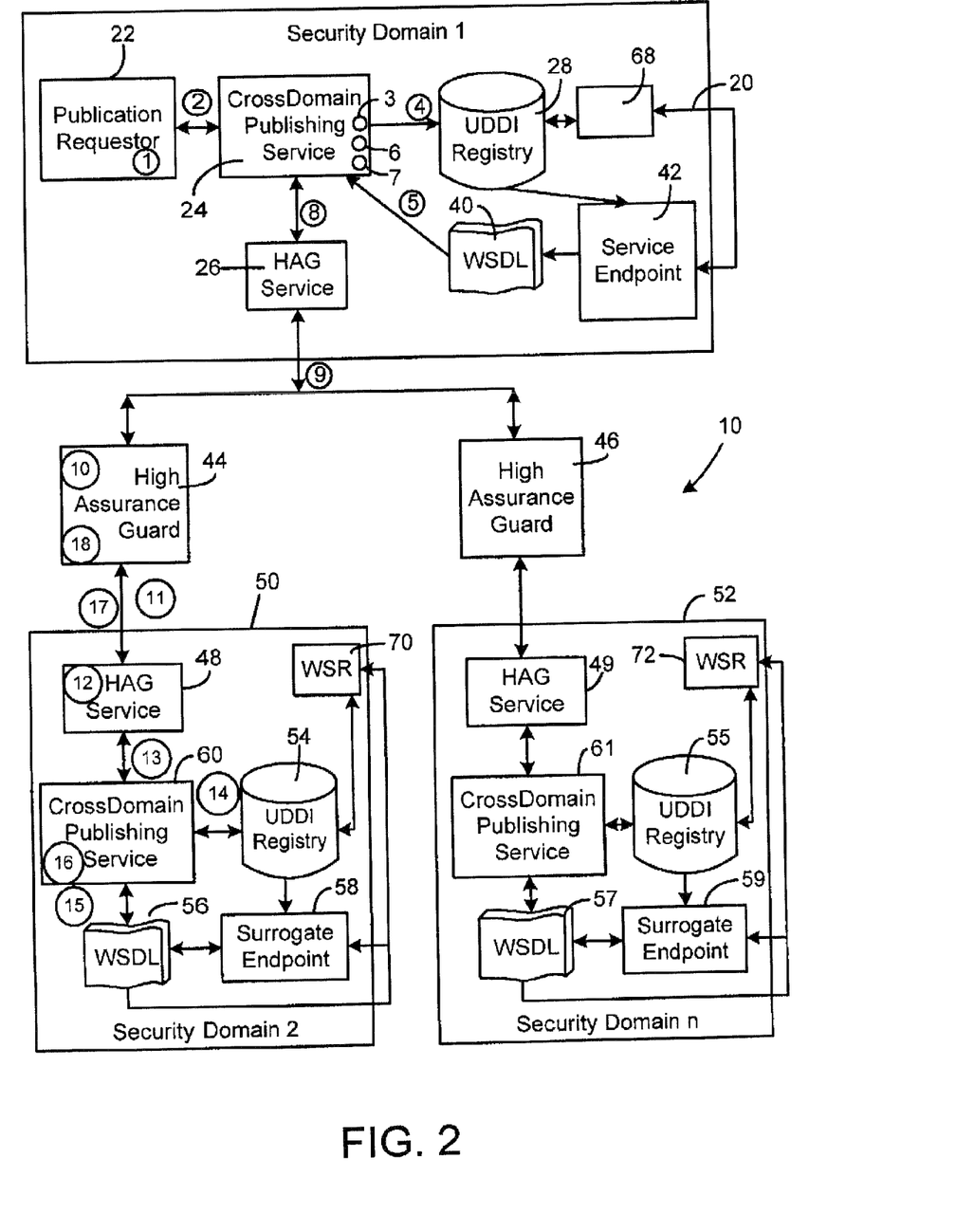
FIG. 2 shows schematically and in block diagram form, a cross-domain Web services publishing and discovery system according to a possible embodiment of the disclosed subject matter.

According to one possible embodiment of the disclosure, as illustrated schematically and in block diagram form in FIG. 2, a cross-domain Web services publishing/discovery system 10 implementing a cross-domain Web services publishing/discovery method may be utilized to provide for the publishing/discovery of Web services information is disclosed. The Web services information may comprise such as Web Service Description Language (WSDL) documents/data and the like, including, e.g., Web service profiles and the like. The system and method may allow for publication from one security enclave (domain) 20 to another 50, 52, of a plurality of 2-n other security domains, of such Web service information across domain boundaries. The concomitant ability to locally discover such published Web service information within the other domain is also accommodated. effectively discovery across a domain boundary, such as within respective domain 50, 52 with regard to a Web service provider residing in domain 20. In addition there may be set up surrogate service endpoints 58, 59 in the respective domains 50, 52 and the addition of the surrogate end points 58, 59 and real endpoints to a service repository 54, 55 in the respective security enclave (domain) 50, 52.

A requester system (client server) 22 in the first security domain 1, 20, may send a message requesting the publication of the availability of a Web service from a Web service provider located (residing) in the domain 20, e.g., itself or a Web service provider, such as service endpoint 42, for which it is acting as a requester broker/agent. The first security domain 20, by way of example, may be of a higher access permission (security clearance) level than any of the respective 2-n domains, illustrated by way of example by domains 50 and 52.

According to a possible embodiment users, including humans and automated systems, within, as an example, a respective one of the 2-n domains, such as 50, 52, may access Web service information descriptions and the like regarding a Web service provider(s) in the one domain 20 locally in a respective one of the other 2-n domains, such as 50, 52.

Such functions may be implemented by a single process (that offers both publishing and discovery operations) or separate processes (that offer a single publishing or discovery operation), herein collectively disclosed, unless expressly stated otherwise, as a respective cross-domain publishing/discovery service 24 in the one domain 20 and 60, 61 in the respective other domains 50, 52, without changing the scope of the present disclosure.

FIG. 2 also shows schematically and in block diagram form further details of a cross-domain Web services publishing/discovery system 10. Sample WSDL for a cross-domain publishing service 24, 60, 61 is listed in the Appendix to this application.

A cross-domain publishing service 24, 60, 61 may make use of a Repository (such as a UDDI), respectively 28, 54, 55 for storing metadata and other information about the Web services it is publishing.

In the target domains 50, 52 this metadata may include the security level of the domain 20 in which the Web service resides, as well as URL's for surrogate endpoints 58, 59 established in the target domain 50, 52. The respective surrogate endpoint 58, 59 may serve as a location where a surrogate endpoint WSDL 56, 57 may be retrieved by potential consumers of the respective Web service (like a normal service endpoint), however the WSDL 56, 57 that is actually returned to the Web service requester ("WSR") such as 70 in domain 50 and 72 in domain 53, may have endpoints and ports that reflect the actual identity and performance characteristics of the Web service provider deploying the Web service from the security domain 20 where resides the Web service provider, as an example web service endpoint 42 in domain 20.

Therefore consumers, like WSR 70 in domain 50 or 72 in domain 52, may be enabled to access the Web service information locally within the respective domain 50, 52, but may still be able to generate bindings that point to the correct remote endpoint, such as 42 in domain 20. They also are able to locally, within domain 50, 52, browse Web services being published from the other domain 20. A service that is desired to be published in multiple domains may have multiple entries, each in a respective repository such as in respective repositories 54, 55 in the target domains 50, 52.

A High Assurance Guard Service (HAG Service) which allows the actual Web services to be executed through the HAG without any changes to the underlying service is described in the above referenced co-pending Boeing Published Patent Application 20080307101, METHOD AND APPARATUS FOR EXECUTING WEB SERVICES THROUGH A HIGH ASSURANCE GUARD.

Figure 4A:
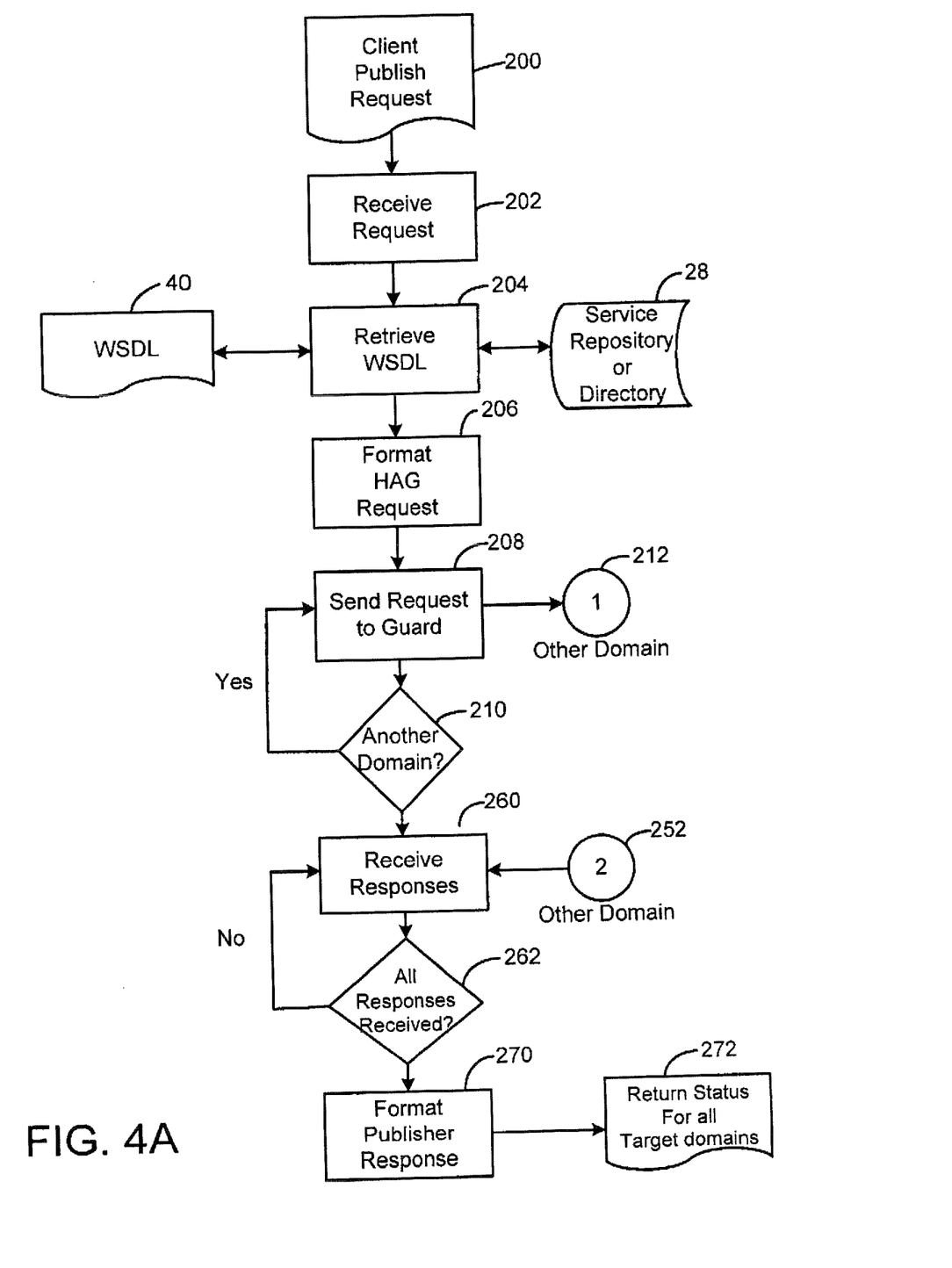
FIGS. 4A and 4B show a flow diagram for a process according to a possible embodiment of the disclosed subject matter.
Figure 4B:
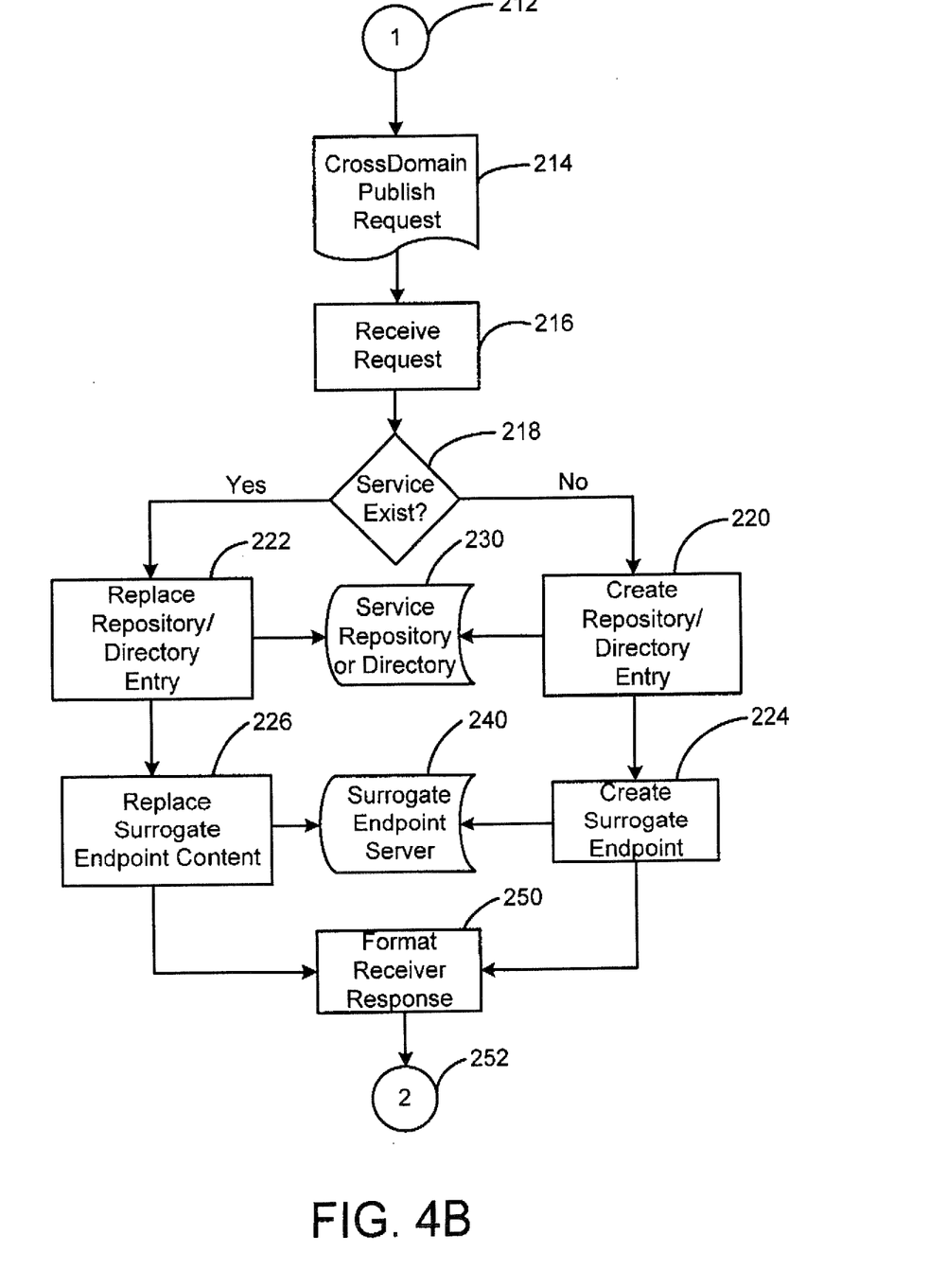

Turning now to FIGS. 2 and 4A and 4B a system and method for publishing/discovering a Web service, e.g., from a security level domain 1, 20 in FIG. 2, to another security level domain within a plurality 2-n of such domains, for example domain 50 or 52 in FIG. 2, may operate according to the following description. Each process step may occur in or between the elements shown in block diagram form in FIG. 2 as represented by the numbered circles in FIG. 2. As represented in circle 1 in FIG. 2, a client program, e.g., residing in a publication requester 22 in domain 20 may format a request to a cross-domain publishing service 24 located in the domain 20, which, as an example, may be of a higher security clearance/access permission level than any of the other 2-n domains, such as domain 50 or 52. This step is carried out in the flow chart of FIG. 4A in box 200. As indicated in circle 2 the client may then invoke the cross-domain publishing service 24. It will be understood that this may be done by an agent of the Web service provider publication requester 22, such as a publication broker or directly by a Web service provider, such as service endpoint 42 in domain 20.

As indicated in circle 3 in FIG. 2 and box 202 of FIG. 4A, the cross-domain publishing service 24 may then receive the publication request. The cross-domain publishing service may then make a request to obtain and obtain Web service information, such as a WSDL reference 40 from a repository, such as a UDDI 28, represented by circle 4 and 5 in FIG. 2 and box 204 in FIG. 4A. As noted above there are a number of possible ways for this to occur, including through the repository 28, or using a link provided from the repository 28 to the Web service provider endpoint 42, or with the repository invoking a link to the endpoint 42 and returning the Web service information to the cross-domain publishing service 24 or having the Web service provider 42 return the Web service information to the cross-domain publishing service 24, etc. Indeed, the Web service provider publication requester 22 or its agent may directly provide the Web service information or parts of that Web service information to the cross-domain publishing service 24, for publication in other domains of differing security clearance/access permission level, similarly to the interactions involved in subscribed repositories such as DIODE.

The cross-domain publishing service 24 may obtain the WSDL 40 from the actual web service endpoint 42 as represented by circle 5 in FIG. 2. The cross-domain publishing service 24 may create call(s) to publish the Web service information to remote endpoints in the other domains, e.g., domains 50, 51, represented by circle 6 in FIG. 2 and occurring in block 204 in FIG. 4A.

The cross-domain publishing service 24 may wrap the call(s) in a HAG Service call in circle 7 in FIG. 2 and block 206 in FIG. 4A. HAG service may then be invoked from HAG 26 in the first domain 20 by the cross-domain publishing service 24 as shown by circle 8 in FIG. 2 and occurring in box 208 in FIG. 4A. In addition FIG. 4A shows in the loop including box 210 that this may be repeated, e.g., n times for n different other domains, such as one time for target domain 50 and one time for target domain 51 shown in FIG. 2.

The HAG service 26 in the originating domain 20 may then route a call to the respective HAG for the respective target domain, such as HAG 44 for domain 50 and HAG 46 for domain 52, as indicated in circle 9 in FIG. 2 and circle 212 in FIGS. 4A and 4B. The respective HAG 44, 46 may scan for content and reject the call if security policies have been violated, referring to circle 10 in FIG. 2 (shown for convenience only in the HAG 44 for domain 50), and in circle 212 in FIGS. 4A and 4B. The HAG 44, 46 may then send the request for publication to a HAG service, respectively 48 in domain 50 and 49 in domain 52, on the receiving domain side in the target security domain 50, 52, as indicated in circle 11 in FIG. 2 and box 214 in FIG. 4B. The HAG service 48, 49 receives and unwraps the message as indicated in circle 12 in FIG. 2 (for domain 50) and box 216 in FIG. 4B. The message may then be routed to the respective cross-domain publishing service 60, 61 in the respective domain 50, 52 where it is processed as illustrated in FIG. 4B, as indicated in circle 13 in FIG. 2. The cross-domain publishing service 60, 61 may then publish the Web service provider web service information to a local service registry 54, 56 as indicated by circle 14 in FIG. 2. The cross-domain publishing service 60, 61 may determine if the Web service provider requesting the publication already exists (has been published in) the target domain 50, 52, as indicated in box 218 in FIG. 4B, and, if not, the cross-domain publishing service 60, 61 may create a repository/directory entry in the depository for the target domain, 54, 55, as represented in blocks 220, 230 of FIG. 4B, and may also set up a surrogate endpoint 58, 59 as represented in blocks 224, 240 in FIG. 4B. If the service is already published in the repository 54, 55, the cross-domain publishing service 60, 61 may treat the request for publication as a request to edit an existing entry, and in block 222 in FIG. 4B replace the repository entry and in block 226 replace the existing surrogate endpoint with a new surrogate endpoint.

The cross-domain publishing service 60, 61 may then return the result to the HAG Service 48, 49 in the respective target domain by formatting a receiver response in block 250 of FIG. 4B and as indicated in circle 17 in FIG. 2. The HAG service may send the result back to the respective HAG 44, 46, represented in blocks 252 in FIGS. 4A and 4B and circle 17 in FIG. 2.

The cross-domain publishing service 24 may receive the HAG responses in block 260 of FIG. 4*a*, circle 20 in FIG and may then format a publisher response in block 270 of FIG. 4A and in block 272 return publication status for its respective target domain 50, 52 to the publication requester 22 in domain 20. As represented in circle 19 of FIG. 2, the HAG service 26 in the originating domain may unwrap the respective result and return each to the cross-domain publishing service 24 in the originating domain where the respective results may be consolidated with others (e.g., for the other target domains in a plurality of target domains from within the 2-n target domains to which the Web service information was published) as indicated in circle 20 in FIG. 2. The cross-domain publishing service 24 may then return the result(s) to the initiating client publication requester 22 as noted above regarding box 272 in FIG. 4A and as indicated in circle 21.

In operation, according to one embodiment of the disclosure, a Web service provider 22, 42 in a first domain 20, having a first access permission level/security clearance level, the publication of Web information regarding which, and/or the discovery of the existence of Web service information regarding which, in the prior art, could not occur across the domain boundary with a domain of differing access permission level, in the prior art, is enabled. Requesters of the Web services of a Web service provider such as 22, 42 in domain 20, e.g., Web service requester ("WSR") 68 in domain 20, could easily have discovered the existence of such Web service provider 22, 42 and established the necessary contacts, criteria, etc. for the provision of the particular Web service by the provider 22, 42 for the requester 68 within the same domain. However, Web service requesters in other domains, such as WSR 70 in domain 50 or WSR 72 in domain 52 previously could not access the publication of the Web service provider and associated Web service information regarding such Web service provider in a different access permission level domain through a cross-domain security system.

According to an aspect of the present disclosure, the publication of the Web service provider can be made to occur within a respective other domain and be accessible (discovered) within that respective other domain. At the same time, according to the present disclosure, when a requester in the other domain seeks to find a Web service provider, locally in the other domain, a surrogate endpoint in that domain can be identified and used to return the appropriate Web service information to the Web service requester including information enabling accessing the Web service provider within the first domain.

Figure 3:
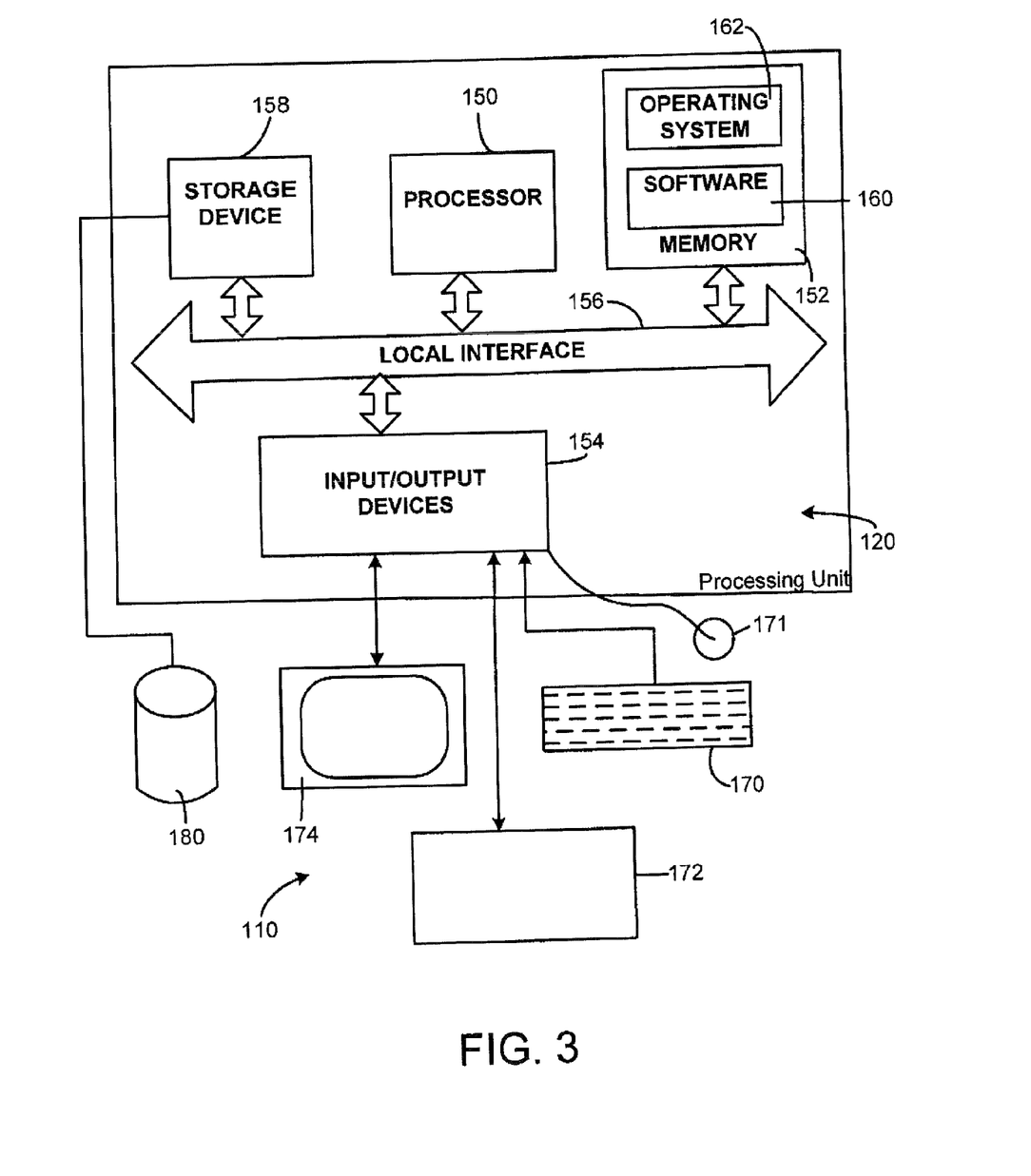
FIG. 3 shows a flow diagram for a process according to a possible embodiment of the disclosed subject matter.

The Web service information returned using the identification of the surrogate endpoint within the local domain may include documents such as a WSDL modified to identify the Web service provider location within the first domain. The cross-domain Web service publishing/discovery system of the present application can be implemented in software (e.g., firmware), hardware, or a combination thereof. In the currently contemplated mode, the cross-domain Web service publishing/discovery system is implemented in software, as an executable program, or programs which is/are executed by a special or general purpose digital computer, such as a personal computer (PC; IBM-compatible, Apple-compatible, or otherwise), workstation, minicomputer, or mainframe computer. An example of a general purpose computer that can implement the disclosed cross-domain Web service publishing/discovery system is shown in FIG. 3. In FIG. 3, the cross-domain Web service publishing/discovery system is denoted by reference numeral 110.

Generally, in terms of hardware architecture, as shown in FIG. 3, the Web service publishing/discovery system 110 includes a computer (processor unit) 120 which includes processor 150, memory 152, and one or more input and/or output (I/O) devices 154 (or peripherals) that are communicatively coupled via a local interface 156. The local interface 156 may be, for example, but not limited to, one or more buses or other wired or wireless connections. The local interface 156 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor unit 120 may be a hardware device for executing software, particularly that stored in memory 152. The processor 150 may be any custom made or commercially available processor, a central processing unit (CPU), an auxiliary processor among several processors associated with the processor unit 120, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 152 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 152 may incorporate electronic, magnetic, optical, and/or other types of storage media. Note that the memory 152 can have a distributed architecture, where various components are situated remote from one another, but can be accessed by the processor unit 120, including as an example storage 158 and database(s) 180.

The software 160 in memory 152 may include one or more separate programs, each of which comprises an ordered listing of executable instructions for implementing logical functions. In the example of FIG. 3, the software 160 in the memory 152 may include the cross-domain Web service publishing/discovery system in accordance with the disclosed subject matter as discussed above and a suitable operating system (O/S) 162. A nonexhaustive list of examples of suitable commercially available operating systems 162 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 162 essentially controls the execution of other computer programs, such as the cross-domain Web service publishing/discovery system 10, illustrated by way of example in FIG. 2 and provides scheduling, input-output control, file and data management, memory management, and communication control and related services.

The cross-domain Web service publishing/discovery system 10 may be a source program, executable program (object code), script, or any other entity comprising a set of instructions to be preformed. When a source program, then the program needs to be translated via a compiler, assembler, interpreter, or the like, which may or may not be included within the memory 152, so as to operate properly in connection with the O/S 162. Furthermore, the cross-domain Web service publishing/discovery system 10 or individual portions thereof may be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada or standard Internet languages, such as XML or HTML. In a currently contemplated mode, the cross-domain Web service publishing/discovery system 10 is written in part using Java scripts and XML.

The I/O devices 154 may include input devices, for example but not limited to, a keyboard 170, mouse 171, printer/scanner 172, microphone (not shown), touch screen 174, etc. Furthermore, the I/O devices 154 may also include output devices, for example but not limited to, a printer/scanner 172, display 174, etc. Finally, the I/O devices 154 may further include devices that communicate both inputs and outputs, for instance but not limited to, a modulator/demodulator (modem; for accessing another device, system, or network) (not shown), a radio frequency (RF) or other transceiver (not shown), a telephonic interface (not shown), a bridge (not shown), a router (not shown), etc.

If the computer 120 is a PC, workstation, or the like, the software 160 in the memory 152 may further include a basic input output system (BIOS) (omitted for simplicity). The BIOS is a set of essential software routines that initialize and test hardware at startup, start the O/S 162, and support the transfer of data among the hardware devices. The BIOS is stored in ROM so that the BIOS can be executed when the computer 120 is activated.

When the computer 120 is in operation, the processor 150 may be configured to execute software 160 stored within the memory 152, to communicate data to and from the memory 152, and to generally control operations of the computer 120 pursuant to the software. The cross-domain Web service publishing/discovery system 10 and the O/S 162, in whole or in part, but typically the latter, may be read by the processor 150, perhaps buffered within the processor 150, and then executed.

When the cross-domain Web service publishing/discovery system 10 is implemented in software, as is shown in FIG. 3, it should be noted that the cross-domain Web service publishing/discovery system 10 can be stored on any computer readable medium for use by or in connection with any computer related system or method. In the context of this disclosure, a computer readable medium may be an electronic, magnetic, optical, or other physical device or means that can contain or store a computer program for use by or in connection with a computer related system or method. The cross-domain Web service publishing/discovery system 10 may be embodied in any computer-readable medium for use by or in connection with an instruction execution system, apparatus, or device, such as a computer-based system, processor-containing system, or other system that can fetch the instructions for the instruction execution system, apparatus, or device and execute the instructions. In the context of this disclosure, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). The computer-readable medium also could be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the cross-domain Web service publishing/discovery system 10 is implemented in hardware, the cross-domain Web service publishing/discovery system can implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be apparent that the scope and content of the present disclosure are not limited to the above embodiments but should be considered in scope and content taking into account the manner in which the disclosed embodiments may be changed and modified without departing from the scope and spirit of the disclosed subject matter and claims, some of which changes and modifications have been noted above.

APPENDIX

```xml
<?xml version="1.0" encoding="UTF-8" standalone="no"?>
<wsdl:definitions xmlns:soap="http://schemas.xmlsoap.org/wsdl/soap/"
    xmlns:uddi="http://www.boeing.com/UDDIPublisher/"
    xmlns:wsdl="http://schemas.xmlsoap.org/wsdl/"
    xmlns:xsd="http://www.w3.org/2001/XMLSchema" name="UDDIPublisher"
    targetNamespace="http://www.boeing.com/UDDIPublisher/">
    <wsdl:types>
        <xsd:schema elementFormDefault="qualified"
            attributeFormDefault="qualified"
            targetNamespace="http://www.boeing.com/UDDIPublisher/">
            <xsd:element name="Publish">
                <xsd:complexType>
                    <xsd:sequence>
                        <xsd:element name="ServiceName" type="xsd:string" />
                        <xsd:element name="ServiceDescription" type="xsd:string" />
                        <xsd:element name="WsdlUrl" type="xsd:string"/>
                        <xsd:element name="Destinations" >
                            <xsd:complexType>
                                <xsd:sequence>
                                    <xsd:element name="Destination" maxOccurs="unbounded" type="xsd:string" />
                                </xsd:sequence>
                            </xsd:complexType>
                        </xsd:element>
                    </xsd:sequence>
                </xsd:complexType>
            </xsd:element>
            <xsd:element name="PublishResponse">
                <xsd:complexType>
                    <xsd:sequence>
                        <xsd:element name="status" type="xsd:string"/>
                        <xsd:element name="Results" >
                            <xsd:complexType>
                                <xsd:sequence>
                                    <xsd:element name="result" maxOccurs="unbounded">
    <xsd:complexType>
    <xsd:sequence>
    <xsd:element
        name="Destination" type="xsd:string" />
    <xsd:element
        name="result" type="xsd:string" />
    </xsd:sequence>
    </xsd:complexType>
                                    </xsd:element>
                                </xsd:sequence>
                            </xsd:complexType>
                        </xsd:element>
                    </xsd:sequence>
                </xsd:complexType>
            </xsd:element>
            <xsd:element name="Register">
                <xsd:complexType>
                    <xsd:sequence>
                        <xsd:element name="ServiceName" type="xsd:string"/>
                        <xsd:element name="ServiceDescription" type="xsd:string" />
                        <xsd:element name="SourceEnclave" type="xsd:string"/>
                        <xsd:element name="Wsdl" type="xsd:string"/>
                    </xsd:sequence>
                </xsd:complexType>
            </xsd:element>
            <xsd:element name="RegisterResponse">
                <xsd:complexType>
                    <xsd:sequence>
                        <xsd:element name="result" type="xsd:string" />
                    </xsd:sequence>
                </xsd:complexType>
            </xsd:element>
        </xsd:schema>
    </wsdl:types>
    <wsdl:message name="PublishRequest">
```

APPENDIX-continued

```
        <wsdl:part element="uddi:Publish" name="parameters" />
    </wsdl:message>
    <wsdl:message name="PublishResponse">
        <wsdl:part element="uddi:PublishResponse" name="parameters" />
    </wsdl:message>
    <wsdl:message name="RegisterRequest">
        <wsdl:part name="parameters" element="uddi:Register"></wsdl:part>
    </wsdl:message>
    <wsdl:message name="RegisterResponse">
        <wsdl:part name="parameters"
element="uddi:RegisterResponse"></wsdl:part>
    </wsdl:message>
    <wsdl:portType name="UDDIPublisher">
        <wsdl:operation name="Publish">
            <wsdl:input message="uddi:PublishRequest" />
            <wsdl:output message="uddi:PublishResponse" />
        </wsdl:operation>
        <wsdl:operation name="Register">
            <wsdl:input message="uddi:RegisterRequest"></wsdl:input>
            <wsdl:output message="uddi:RegisterResponse"></wsdl:output>
        </wsdl:operation>
    </wsdl:portType>
    <wsdl:binding name="UDDIPublisherSOAP" type="uddi:UDDIPublisher">
        <soap:binding style="document"
            transport="http://schemas.xmlsoap.org/soap/http" />
        <wsdl:operation name="Publish">
            <soap:operation
soapAction="http://www.boeing.com/UDDIPublisher/NewOperation" />
            <wsdl:input>
                <soap:body use="literal" />
            </wsdl:input>
            <wsdl:output>
                <soap:body use="literal" />
            </wsdl:output>
        </wsdl:operation>
        <wsdl:operation name="Register">
            <soap:operation
soapAction="http://www.boeing.com/UDDIPublisher/NewOperation" />
            <wsdl:input>
                <soap:body use="literal" />
            </wsdl:input>
            <wsdl:output>
                <soap:body use="literal" />
            </wsdl:output>
        </wsdl:operation>
    </wsdl:binding>
    <wsdl:service name="UDDIPublisher">
        <wsdl:port binding="uddi:UDDIPublisherSOAP"
            name="UDDIPublisherSOAP">
            <soap:address location="http://www.example.org/" />
        </wsdl:port>
    </wsdl:service>
</wsdl:definitions>
```

I claim:

1. A cross-domain Web service publishing system embodied on one or more processing devices comprising:
    a source security domain having a first security clearance classification;
    a first cross-domain publishing service located in the source security domain to:
        receive a Web service publication request from a service publication requester;
        retrieve a Web services description language reference for the Web service from a remote source;
        create a call to publish the Web service; and
        transmit the call to a first security server located in the source security domain;
    a destination security domain having a second security clearance classification;
    a second cross-domain publishing service within the destination security domain to:
        receive the Web service publication request;
        establish a surrogate end point within the destination security domain; and
        publish at the surrogate end point a Web services description language reference regarding the provision of the Web service by the Web service provider; and
    a high assurance guard (HAG) service configured to provide communication connections between the first cross-domain publishing service and the second cross-domain publishing service;
    wherein the HAG service comprises a source HAG node in the source security domain and a destination HAG node in the destination security domain;
    wherein the source HAG node is configured to receive the Web service publication request, and to determine whether the Web service publication request violates one or more security rules;
    wherein the destination HAG node is configured to receive the Web service publication request from the source HAG node, unwrap the Web service publication request, and pass the Web service publication request to the second cross-domain publishing service; and wherein the second cross-domain publishing service is configured to determine whether the service identified in the Web service publication request violates one or more security rules, and to create a repository and directory for the service identified in the Web service publication request.

2. The system of claim 1 wherein the HAG service further comprises:
at least one intermediate HAG node in the communication path between the source HAG node and the destination HAG node.

3. The system of claim 2 wherein the source HAG node is further configured to transmit the Web service publication request in response to a determination that the Web service publication request does not violate one or more security rules.

4. The system of claim 1 wherein the Web service publication request identifies a first service endpoint in the source security domain, and wherein a consumer in the destination security domain generates a binding that points to the first service endpoint in the source security domain.

5. A method to publish Web service information regarding a Web service provider in a source security domain into a destination security domain, wherein said source security domain has a first security clearance classification and said destination security domain has a second security classification, comprising:
in a first cross-domain publishing service location in the source security domain:
receiving a Web service publication request from a service publication requester;
retrieving a Web services description language reference for the Web service from a remote source;
creating a call to publish the Web service; and
transmitting the call to a first security server located in the source security domain;
in a second cross-domain publishing service within the destination security domain:
establishing a surrogate end point within the destination security domain; and
publishing at the surrogate end point a Web services description language reference regarding the provision of the Web service by the Web service provider;
wherein the source security domain and the destination security domain are communicatively coupled through a high assurance guard (HAG) service;
wherein the HAG service comprises a source HAG node in the source security domain and a destination HAG node in the destination security domain;
wherein the source HAG node is configured to receive the Web service publication request, and to determine whether the Web service publication request violates one or more security rules;
wherein the destination HAG node is configured to receive the Web service publication request from the source HAG node, unwrap the Web service publication request, and pass the Web service publication request to the second cross-domain publishing service; and
wherein the second cross-domain publishing service is configured to determine whether the service identified in the web service publication request violates one or more security rules, and to create a repository and directory for the service identified in the Web service publication request.

6. The method of claim 5 wherein the HAG service further comprises:
at least one intermediate HAG node in the communication path between the source HAG node and the destination HAG node.

7. The method of claim 5 wherein the source HAG node:
transmits the Web service publication request in response to a determination that the Web service publication request does not violate one or more security rules.

8. The method of claim 5 wherein the Web service publication request identifies a first service endpoint in the source security domain, and wherein a consumer in the destination security domain generates a binding that points to the first service endpoint in the source security domain.

* * * * *